(12) United States Patent
Watanabe

(10) Patent No.: US 6,311,714 B1
(45) Date of Patent: Nov. 6, 2001

(54) SEISMIC DETECTING SHUT-DOWN VALVE DEVICE

(75) Inventor: Susumu Watanabe, Hiratsuka (JP)

(73) Assignee: Nichigi Engineering Co., Ltd., Fujisawa (JP)

( * ) Notice: Subject to any disclaimer, the term of this patent is extended or adjusted under 35 U.S.C. 154(b) by 0 days.

(21) Appl. No.: 09/435,729

(22) Filed: Nov. 8, 1999

(30) Foreign Application Priority Data

Nov. 16, 1998 (JP) .................................................. 10-325099

(51) Int. Cl.$^7$ ............................ F16K 31/54; G05G 21/00
(52) U.S. Cl. ................................ 137/38; 251/29; 251/73; 60/417
(58) Field of Search ................................ 137/38; 251/28, 251/73, 29; 60/417

(56) References Cited

U.S. PATENT DOCUMENTS

| | | | |
|---|---|---|---|
| 4,503,717 | * 3/1985 | Keller et al. | ............................ 137/38 |
| 4,852,600 | * 8/1989 | Asbra et al. | ............................ 137/38 |
| 5,595,207 | * 1/1997 | Jiles | ........................ 137/38 |

* cited by examiner

Primary Examiner—Michael P Buiz
Assistant Examiner—Ramesh Krishnamurthy

(57) ABSTRACT

A fluid path opening/closing valve comprises a plate-like valve plug and a rack which is fixed to a piston of an emergency shut-down air cylinder. The rack meshes with a pinion which rotates by a reversible motor with a clutch. If a seismic detecting valve detects earthquake which has over predetermined seismic intensity and opens, compressed air is sent from an air tank via the opened seismic detecting valve to a switching cylinder which disconnects the clutch. At the same time, compressed air is sent from the air tank to the emergency shut-down air cylinder via a delay valve to lower the piston with the fluid-path opening/closing valve which closes the fluid path.

9 Claims, 1 Drawing Sheet

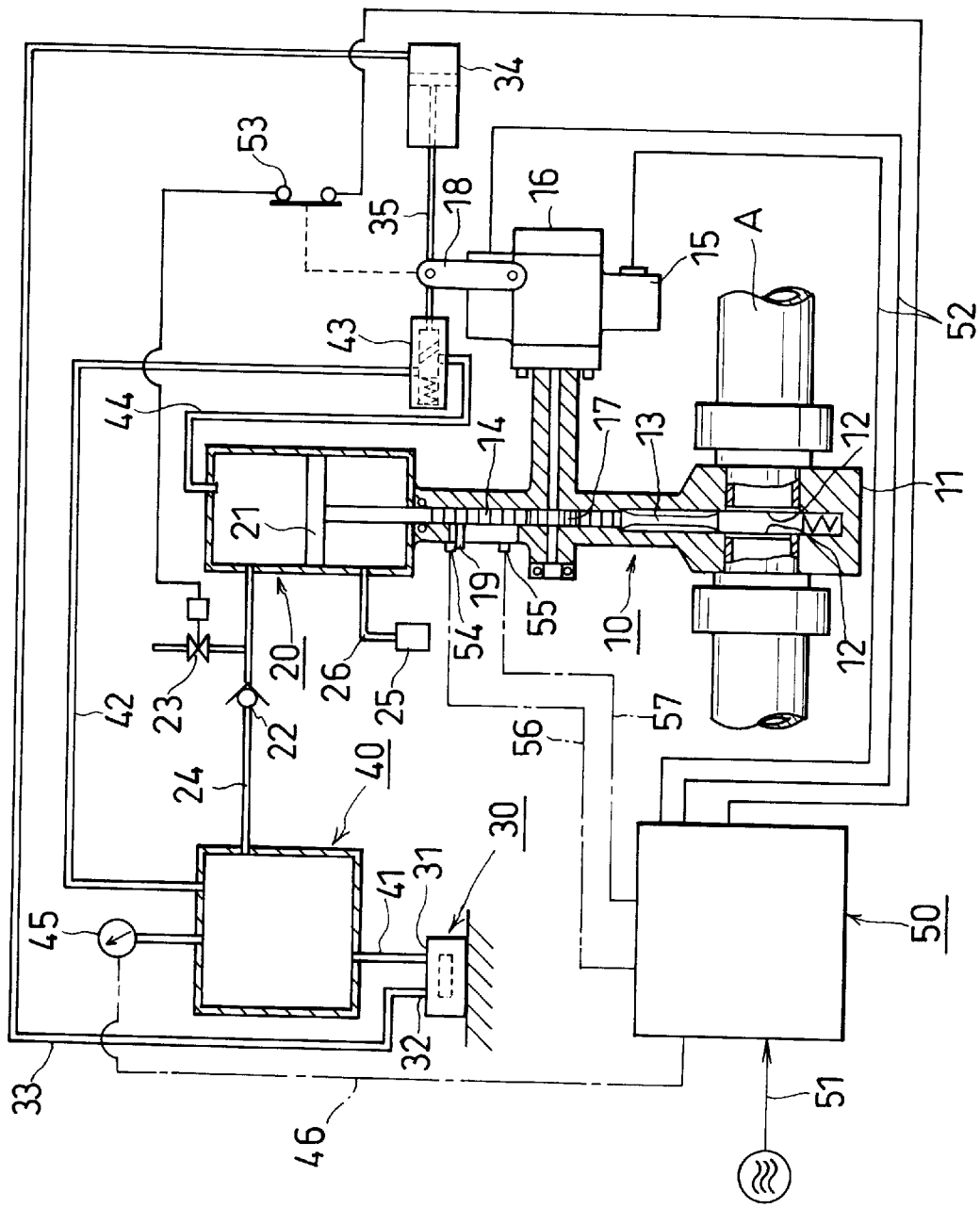

SEISMIC DETECTING SHUT-DOWN VALVE DEVICE

BACKGROUND OF THE INVENTION

The present invention relates to a seismic detecting shut-down valve device in which a fluid path is rapidly closed by a fluid-path opening/closing valve which is moved down by air which is sent into an emergency shut-down cylinder.

There are various types of seismic detecting valve devices in which a fluid-path valve is opened when it detects earthquake which has over a certain seismic intensity, to send compressed air to an emergency shut-down valve which rapidly closes a fluid path.

The known seismic detecting shut-down valve is provided separately from a valve for opening and closing a fluid path. Thus, the structure becomes complicate and expensive, and its installation and maintenance need a lot of time and work.

SUMMARY OF THE INVENTION

It is an object of the present invention to provide a seismic detecting shut-down valve device which overcomes the foregoing disadvantage in the prior art.

BRIEF DESCRIPTION OF THE DRAWINGS

The features and advantages of the present invention will become more apparent from the following description with respect to an embodiment as shown in the attached drawing wherein:

FIGURE illustrates an embodiment of a seismic detecting shut-down valve device according to the present invention, in which double solid lines show compressed air supply tubes, solid lines show power supply wires and dotted lines show signal lines.

DETAILED DESCRIPTION OF PREFERRED EMBODIMENTS

One embodiment of the present invention will be described with respect to FIGURE.

A device according to the present invention is a fluid path valve 10, an emergency shut-down air cylinder 20, a seismic detecting valve 30, an air tank 40 and a controller 50 as main components.

The fluid path valve 10 is electrically operated, and comprises a sliding valve which comprises a valve casing 11, valve seats 12,12 which oppose each other in the valve casing 11, and a plate-like valve plug 13 which is vertically slidable on the valve seats 12,12.

The lower end of a rack 14 is fixed to the upper end of the plate-like valve plug 13. A pinion 17 driven by a reversible motor 15 meshes with part of the rack 14 with a clutch 16 which is unoperationally or usually connected. The clutch 16 is switched by a switching lever 18. A sideward projection 19 is provided on the rack 14. An emergency shut-down air cylinder 20 is provided right over the electric valve 10, and the upper end of the rack 14 is fixed to a piston 21 in the air cylinder 20.

An upper space above the piston 21 in the emergency shutdown air cylinder 20 is connected to an air tank 40 via a tube 24 which has a check valve 22 and an electromagnetic valve 23, the check valve 22 being able to open only in a direction to the air tank 40.

The electromagnetic valve 23 is closed when an electric current is not applied, and is opened when an electric current is applied from a controller 50 via an electric wire 52 which will be described as below. A shut-down switch 53 for turning off an electric current to the electromagnetic valve 23 is provided on the electric line 52. A lower space under the piston 21 in the emergency shut-down air cylinder 20 communicates with the outside air via an intake/exhaust tube 26 which has an air cleaner 25 at the end. The seismic detecting valve 30 is opened if it detects vibration above a predetermined value, so that an inlet. 31 communicates with an outlet 32. The inlet 31 is connected to the air tank 40 via an intake tube 41, and the outlet 32 is connected via a tube 33 to a switching cylinder 34 for operating the clutch 16.

The switching cylinder 34 is connected to the clutch 16 via a rod 35 and a switching lever 18 under non-operating condition, and the clutch 16 is disconnected when it is actuated by compressed air.

A delay valve 43 which is connected to a supply tube 42 from the air tank 40 is connected to one end of the rod 35. As soon as the clutch 16 is disconnected by operation of the switching cylinder 34, the delay valve 43 is slowly opened, so that the supply tube 42 from the air tank 40 communicates with an air tube 44 which is connected to the upper space in the emergency shut-down air cylinder 20. The air tank 40 is connected to an air gauge 45 which transmits an electric signal to the controller 50 via a signal line 46 when air gauge 45 shows less than a predetermined value.

When the seismic detecting valve 30 is opened, compressed air in the air tank 40 is transferred to the switching cylinder 34 via the seismic detecting valve 30 and the tube 33. Then, the switching lever 18 pivots by the rod 35 which extends from the switching cylinder 34 to disconnect the clutch.

By actuating the switching cylinder 34 by mechanical means and other suitable compressed air and, thus, pivoting the switching lever 18 by the rod 35, the shut-down switch 53 is opened. Opening of the shut-down switch 53 causes the electromagnetic valve 23 to come to electrically non-conductive condition and to close as above.

To the controller 50, a power source 51, the signal line 46, power supply lines 52 to the electromagnetic valve 23, the motor 15 and the clutch 55, and signal lines 56,57 from limit switches 54,55 are connected.

To achieve the object depending on operative modes as below, the controller 50 is programmed to connect the motor 15, the clutch 16 and the electromagnetic valve 23 to the power source 51.

The foregoing device operates with three modes, i.e. ordinary operative, emergency shut-down and pressure storage modes, which will be described as below:

Ordinary Operative Mode

"Ordinary operation" means that the fluid path opening/closing valve 10 is opened and closed by an ordinary operation switch (not shown) in the controller 50. The seismic detecting valve 30 is closed, so that compressed air does not come to the switching cylinder 34, which is not operative. The clutch 16 is connected.

The ordinary operating switch turns on in the controller 50, and an electric current is applied to the electromagnetic valve 23, which opens. The motor 15 is normally or reversely rotated depending on vertical position of the plate-like valve plug 13 determined by rotary angle of the pinion 17, so that the rack 14 is moved up and down to open and close the plate-like valve plug 13. The vertical position of the plate-like valve plug 13 is determined by suitable known means, for example, by converting rotary angle or rotation amount electrically. The vertical position of the plate-like valve plug 13 may be detected by other conventional means.

When it is detected that the plate-like valve plug reaches to full-open position or full-closed position, the controller 51 is operated by suitable means (not shown) based on a position of the plate-like valve plug 13 or rotation of the pinion 17 at that time, so that power supply to the motor 15 and the clutch 16 is interrupted.

Means for interrupting power supply to the motor 15 and the clutch 16 when the plate-like valve plug 13 is full-opened or -closed may be photo-electric switch or limit switches at upper and lower limits of the plate-like valve plug 13.

In this case, with elevation of the plate-like valve plug 13, the sideward projection 19 is engaged on the limit switches 54,55 of the valve casing 11. Thus, even if an electric signal is transmitted to the controller 50, it will be electrically inoperative or ineffective to power supply condition through the power supply lines 52.

Emergency Shut-Down Mode

When an emergency shut-down switch (not shown) turns on in the controller 50, and if an earthquake higher than a predetermined intensity occurs, the opened valve plug 13 of the fluid path opening/closing valve 10 is lowered immediately to close the fluid path "A" rapidly.

When the emergency shut-down switch turns on in the controller 50, the seismic detecting valve 30 is opened and compressed air in the air tank 40 is forwarded to the switching cylinder 34 via the intake tube 41, the inlet 31, the outlet 32 and the tube 33. Then, the switching cylinder 34 is operated to pivot the switching lever 18, so that the clutch 16 is disconnected to let the pinion 17 free.

At the same time, the delay valve 43 is opened by the rod 35, and compressed air in the air tank 40 is forwarded to the emergency shut-down air cylinder 20 via the supply tube 42, the delay valve 43 and the tube 44. Thus, the piston 21 is moved down, and the fluid path "A" is full-closed by the plate-like valve plug 13.

In the earthquake, if the electromagnetic valve 23 is electrically conductive and opened, there would be no problem in the above operation.

However, when power supply stops at the power source, the electromagnetic valve 23 is not electrically conductive and closed. But, even in the case, the switching cylinder 34 operated by compressed air allows the switching lever 18 to pivot via the rod 35, the clutch 6 is disconnected and the delay valve 43 is opened.

Therefore, compressed air in the air tank 40 is forwarded to the upper space in the air cylinder 20 via the supply tube 42, the delay valve 43 and the tube 44, so that the piston 21 is moved down to close the fluid path "A" of the plate-like valve plug 13.

In this case, with lowering of the plate-like valve plug 13, even if the sideward projection 19 is engaged on the lower limit switch 55 to transmit an electric signal to the controller 50, of course, it would be electrically inoperative clearly.

In an earthquake, if the plate-like valve plug 13 closes the fluid path "A", power feed to the motor 15 and the clutch 16 is stopped as described in "Ordinary Operative Mode".

Therefore, the switching cylinder 34 is operated by compressed air, the motor 15 remains stopped, and thus, even if compressed air is forwarded to the upper space of the emergency shut-down air cylinder 20 by opening the delay valve 43, the plate-like valve plug 13 would not be actuated.

Pressure Storage Mode

When a pressure storage switch (not shown) turns on in the controller 50, if air pressure in the air tank 40 lowers to less than a predetermined value, compressed air is automatically fed to the air tank 40 to keep its pressure in a predetermined value.

In the condition that the pressure storage switch turns on in the controller 50, air pressure in the air tank 40 is lowered and indication of the air gauge 46 is lowered to a certain value, so that an electric signal is transmitted to the controller 50 via the signal line 46.

Then, an electric current is applied to the motor 15 and the clutch 16 via the power supply line 52. In the meantime, an electric current is supplied to the electromagnetic valve 23 when the pinion 17 is rotated by the motor 15 to lower the piston 21, and the electromagnetic valve 23 is opened, but when the motor 15 rotates to elevate the piston 21, an electric current is not supplied to the electromagnetic valve 23.

Thus, the pinion 17 is rotated in normal or reverse direction, and the rack 14 is elevated within the range from about a half to full opening of the fluid path "A" by the plate-like valve plug 13.

Vertical stroke of the rack 14 is controlled by engaging the sideward projection 19 of the rack 14 with the upper and lower limit switches 56,57 mounted to the valve casing 11 of the fluid path opening/closing valve 10 to actuate suitable switching means in the controller 50. Other means may be used by person skilled in the art.

The lower space under the piston 21 in the emergency shut-down air cylinder 20 communicates with the outside via the intake/exhaust tube 26, and the electromagnetic valve 23 is electrically conductive and closed when the piston 21 is elevated. By the piston 21 which moves up with the rack 14, the upper space in the emergency shut-down air cylinder 20 is compressed, and compressed air is sent to the air tank 40 via the check valve 22.

When the piston 21 moves down, an electric current is applied to the electromagnetic valve 23, which is opened as described above. Thus, outside air is inhaled by the electromagnetic valve 23 with decompression in the upper space above the piston of the emergency shut-down cylinder 20. Air is automatically stored until the indication of an air gauge 45 goes up to a predetermined value.

The foregoing merely relate to an embodiment of the invention. Various changes and modifications may be made by person skilled in the art without departing from the scope of claims wherein.

What is claimed is:

1. A seismic detecting shut-down valve device which comprises:

a fluid path opening/closing valve for opening and closing a fluid path;

an emergency shut-down air cylinder connected to the fluid path opening/closing valve and having a piston actuated by compressed air; a seismic detecting valve; and an air tank connected to the emergency shut-down air cylinder and the seismic detecting valve, compressed air being sent to the emergency shut-down air cylinder to lower the piston to close the fluid path by the fluid-path opening/closing valve, when said seismic detecting valve detects earthquake which has over predetermined seismic intensity, wherein the fluid path opening/closing valve comprises a rack and a plate-like valve plug, said rack being fixed to the piston of the emergency shut-down air cylinder.

2. A seismic detecting shut-down valve device as claimed in claim 1 wherein the rack meshes with a pinion which is rotated by a reversible motor via a clutch, said clutch being disconnected by the compressed air from the air tank via a tube having a seismic detecting valve if the seismic detecting valve opens by detecting earthquake which has over a predetermined seismic intensity.

3. A seismic detecting shut-down valve device as claimed in claim 2 wherein the air tank is connected to the emergency shut-down air cylinder via a delay valve, the compressed air being supplied from the air tank via delay valve to the emergency shut-down air cylinder to lower the piston so that the fluid path opening/closing valve closes the fluid path.

4. A seismic detecting shut-down valve device as claimed in claim 2 wherein the clutch is disconnected by a switching cylinder which is actuated by the compressed air from the air tank via a tube.

5. A seismic detecting shut-down valve device as claimed in claim 2 wherein the emergency shut-down air cylinder is connected to the air tank via a tube which has an electromagnetic valve and a check valve which opens only in a direction to the air tank.

6. A seismic detecting shut-down valve device as claimed in claim 5 wherein an air gauge of the air tank is connected to a controller via a signal line.

7. A seismic detecting shut-down valve device as claimed in claim 6 wherein the controller is connected to the motor, the clutch and the electromagnetic valve via electric wires respectively.

8. A seismic detecting shut-down valve as claimed in claim 7 wherein the air gauge indicates below a predetermined pressure in the air tank to transmit an electric signal to the controller which transmits an electric signal to the motor and the clutch to rotate the pinion to elevate the rack and the piston to send air from the emergency shut-down air cylinder to the air tank via the check valve with the electromagnetic valve being closed.

9. A seismic detecting shut-down valve device as claimed in claim 6 wherein the controller is connected to upper and lower limit switches via signal lines respectively, a sideward projection of the rack of the fluid path opening-closing valve being engaged with one of the upper and lower limit switches to detect full-opening or full-closing position of the plate-like valve plug to transmit an electric signal to the controller so as to stop an electric current to the motor and the clutch.

* * * * *